US012802395B2

(12) United States Patent
Takashima

(10) Patent No.: US 12,802,395 B2
(45) Date of Patent: Nov. 17, 2026

(54) CLOUD OBSERVATION SYSTEM, CLOUD OBSERVATION METHOD, AND COMPUTER-READABLE RECORDING MEDIUM

(71) Applicant: Furuno Electric Co., Ltd., Nishinomiya (JP)

(72) Inventor: Yuya Takashima, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 360 days.

(21) Appl. No.: 18/161,700

(22) Filed: Jan. 30, 2023

(65) Prior Publication Data

US 2023/0177803 A1 Jun. 8, 2023

Related U.S. Application Data

(63) Continuation-in-part of application No. PCT/JP2021/026180, filed on Jul. 12, 2021.

(30) Foreign Application Priority Data

Aug. 12, 2020 (JP) ................................ 2020-136362

(51) Int. Cl.
*G06V 10/60* (2022.01)
*G06V 10/44* (2022.01)
*G06V 20/10* (2022.01)

(52) U.S. Cl.
CPC .............. *G06V 10/60* (2022.01); *G06V 10/44* (2022.01); *G06V 20/10* (2022.01)

(58) Field of Classification Search
CPC ........ G06V 10/60; G06V 10/44; G06V 10/40; G06V 20/10; G06V 20/13; G06V 20/52;
(Continued)

(56) References Cited

U.S. PATENT DOCUMENTS 9,805,293 B2 * 10/2017 Zheng ..................... G06F 18/22
2015/0301226 A1 * 10/2015 Sun ....................... G01J 1/4204
702/3
(Continued)

FOREIGN PATENT DOCUMENTS

JP H05333160 A 12/1993
JP 2003329780 A 11/2003
(Continued)

OTHER PUBLICATIONS

Huo J, Lu D. Cloud determination of all-sky images under low-visibility conditions. Journal of atmospheric and oceanic technology. Oct. 2009;26(10):2172-81 (Year: 2009).*
(Continued)

*Primary Examiner* — Oneal R Mistry
*Assistant Examiner* — Duy Tran
(74) *Attorney, Agent, or Firm* — Alleman Hall LLP

(57) ABSTRACT

To provide a cloud observation system, a method, and a computer-readable recording medium capable of observing clouds at night by a camera. Cloud observation system provides an acquisition unit that acquires a sky image taken by a camera that contain the sky, a threshold determination unit that determines a threshold value based on a plurality of pixel values of a plurality of edges in the sky image and a cloud determination unit that determines a pixel indicating a cloud from a plurality of pixels constituting the sky image based on the threshold value and the plurality of pixel values in the sky image.

15 Claims, 13 Drawing Sheets

(58) Field of Classification Search
CPC .... G06V 20/80; G06V 10/751; G06V 10/422; G06V 10/74; G06V 10/758; G06V 10/759
See application file for complete search history.

(56) References Cited

U.S. PATENT DOCUMENTS

| | | | | |
|---|---|---|---|---|
| 2017/0031056 | A1 | 2/2017 | Vega-Avila et al. | |
| 2017/0372120 | A1* | 12/2017 | Revell | G06T 7/11 |
| 2017/0372167 | A1* | 12/2017 | Shen | G06T 7/13 |
| 2018/0372914 | A1* | 12/2018 | Yan | G01W 1/10 |
| 2019/0064055 | A1* | 2/2019 | Lietzke | G06T 7/11 |
| 2019/0158011 | A1 | 5/2019 | West et al. | |
| 2019/0325581 | A1* | 10/2019 | Yan | G06V 20/13 |

FOREIGN PATENT DOCUMENTS

| | | | |
|---|---|---|---|
| JP | 2012244539 | A | 12/2012 |
| JP | 2017198464 | A | 11/2017 |
| JP | 2020098389 | A | 6/2020 |
| JP | 2020106484 | A | 7/2020 |
| WO | 2019244510 | A1 | 12/2019 |
| WO | 2020080373 | A1 | 4/2020 |

OTHER PUBLICATIONS

Mommert M. Cloud identification from all-sky camera data with machine learning. The Astronomical Journal. Mar. 30, 2020; 159(4):178 (Year: 2020).*

Huo, J. et al., "Examination of the Quality of GOSAT/CAI Cloud Flag Data over Beijing Using Ground-based Cloud Data," Advances in Atmospheric Sciences, vol. 30, No. 6, Oct. 20, 2013, 9 pages.

Mommert, M., "Cloud Identification from All-sky Camera Data with Machine Learning," arXiv:2003.11109v1, Mar. 24, 2020, 21 pages.

Huo, J. et al., "Cloud Determination of All-Sky Images under Low-Visibility Conditions," Journal of Atmospheric and Oceanic Technology, vol. 26, No. 10, Oct. 1, 2009, 10 pages.

European Patent Office, Extended European Search Report Issued in Application No. 21855843.5, May 27, 2024, Germany, 7 pages.

* cited by examiner

CLOUD OBSERVATION SYSTEM, CLOUD OBSERVATION METHOD, AND COMPUTER-READABLE RECORDING MEDIUM

CROSS-REFERENCE TO RELATED APPLICATION

The present application is a continuation in part of PCT/JP2021/026180, filed on Jul. 12, 2021, and is related to and claims priority from Japanese patent application no. 2020-136362, filed on Aug. 12, 2020. The entire contents of the aforementioned applications are hereby incorporated by reference herein.

TECHNICAL FIELD

This disclosure relates to cloud observation systems, cloud observation methods, and programs.

BACKGROUND

It is known to use ground-based all-sky cameras as cloud observation methods.

Nighttime cloud observation methods using cameras are required.

SUMMARY

The present disclosure provides cloud observation systems, methods and programs that enable night clouds to be observed by cameras.

The cloud observation system of the present disclosure is provided with an acquisition unit configured to acquire a sky image taken by a camera that contains the sky, and a threshold determination unit configured to determine a threshold value based on a plurality of pixel values of a plurality of edges in the sky image; and a cloud determination unit configured to determine a pixel indicating a cloud from a plurality of pixels constituting the sky image based on the threshold value and the plurality of pixel values in the sky image.

In an aspect, the threshold determination unit may determine the threshold value based on a lightness of the plurality of pixels of the plurality of edges, and the cloud determination unit determines the pixel indicating the cloud based on the lightness of the pixel in the sky image and the threshold value.

In an aspect, the cloud observation system may further comprise an area setting unit configured to set a plurality of areas in the sky image, wherein the threshold determination unit may determine a plurality of threshold values of each of the plurality of areas, and the cloud determination unit may determine the pixel indicating the cloud using the plurality of threshold values for each of the plurality of areas.

In an aspect, the sky image may be an image taken by an all-sky camera, and the threshold determination unit may determine the plurality of threshold values of each of the plurality of areas based on the plurality of pixel values of the plurality of edges in the plurality of areas and the plurality of pixel values of a fringe part of the sky image.

In an aspect, the cloud observation system may further comprise a moon detection unit configured to detect pixels indicating a moon in the sky image, wherein the plurality of areas include a first area indicating or adjacent to the moon and a second area further away from the moon than the first area, and the threshold determination unit may determine the threshold values of each of the areas based on the pixel values of the edges in a plurality of areas including the first area and the second area and set the threshold values of the first area and the second area to different values.

In an aspect, the threshold determination unit may extract a plurality of edges in the sky image and determines the threshold values for each of the plurality of pixels constituting the sky image based on a distance from the pixel to the edge and the pixel value of the edge, and the cloud determination unit may determine the pixel indicating the cloud using threshold values of each pixel constituting the sky image.

In an aspect, the moon detection unit may be configured to detect pixels indicating the moon in the sky image, and the threshold determination unit may extract the edge by removing a range of the moon from a target range for extracting edges.

In an aspect, the acquisition unit may acquire a first sky image, and the threshold determination unit may adopt the threshold value determined based on a second sky image taken at the same time zone on a different day from the date and time of taking the first sky image as the threshold value of the first sky image when the number of edges extracted based on the acquired first sky image is equal to or less than a predetermined value.

In an aspect, the sky image may be an image taken by an all-sky camera, and the threshold determination unit may extract the edge by removing the fringe part of the sky image from a target range for extracting edges.

A cloud observation method includes acquiring a sky image taken by a camera that contains the sky and determining a threshold value based on a plurality of pixel values of a plurality of edges in the sky image and determining a pixel indicating a cloud from a plurality of pixels constituting the sky image based on the threshold value and the plurality of pixel values in the sky image.

A non-transitory computer-readable medium having stored thereon computer-executable instructions which, when executed by a computer, cause the computer to execute the cloud observation method.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

Figure 1:
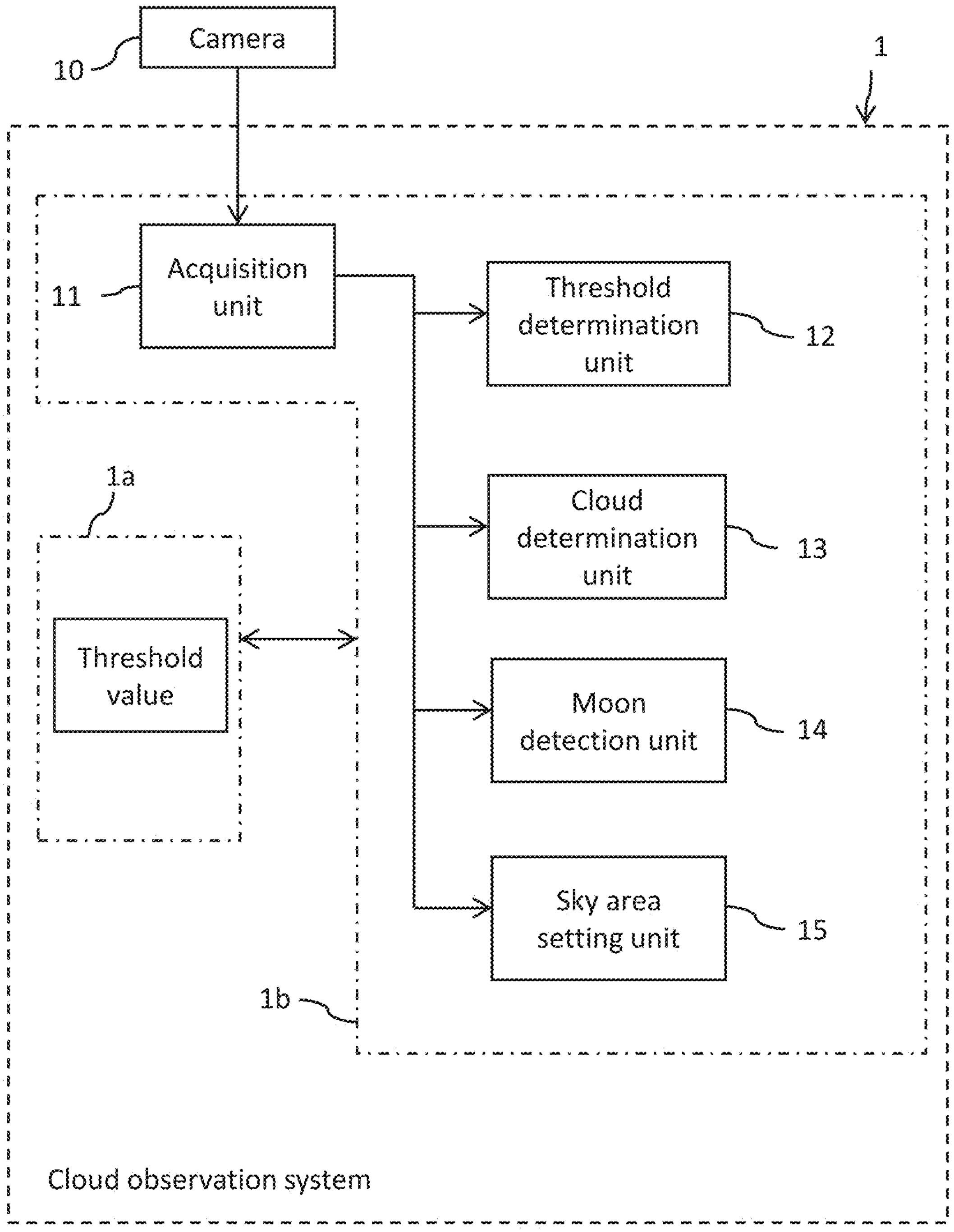
FIG. 1 is a block diagram illustrating the configuration of the cloud observation system of a first embodiment.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The cloud observation system of a first embodiment of the present disclosure is described below with reference to the drawings.

Figure 2:
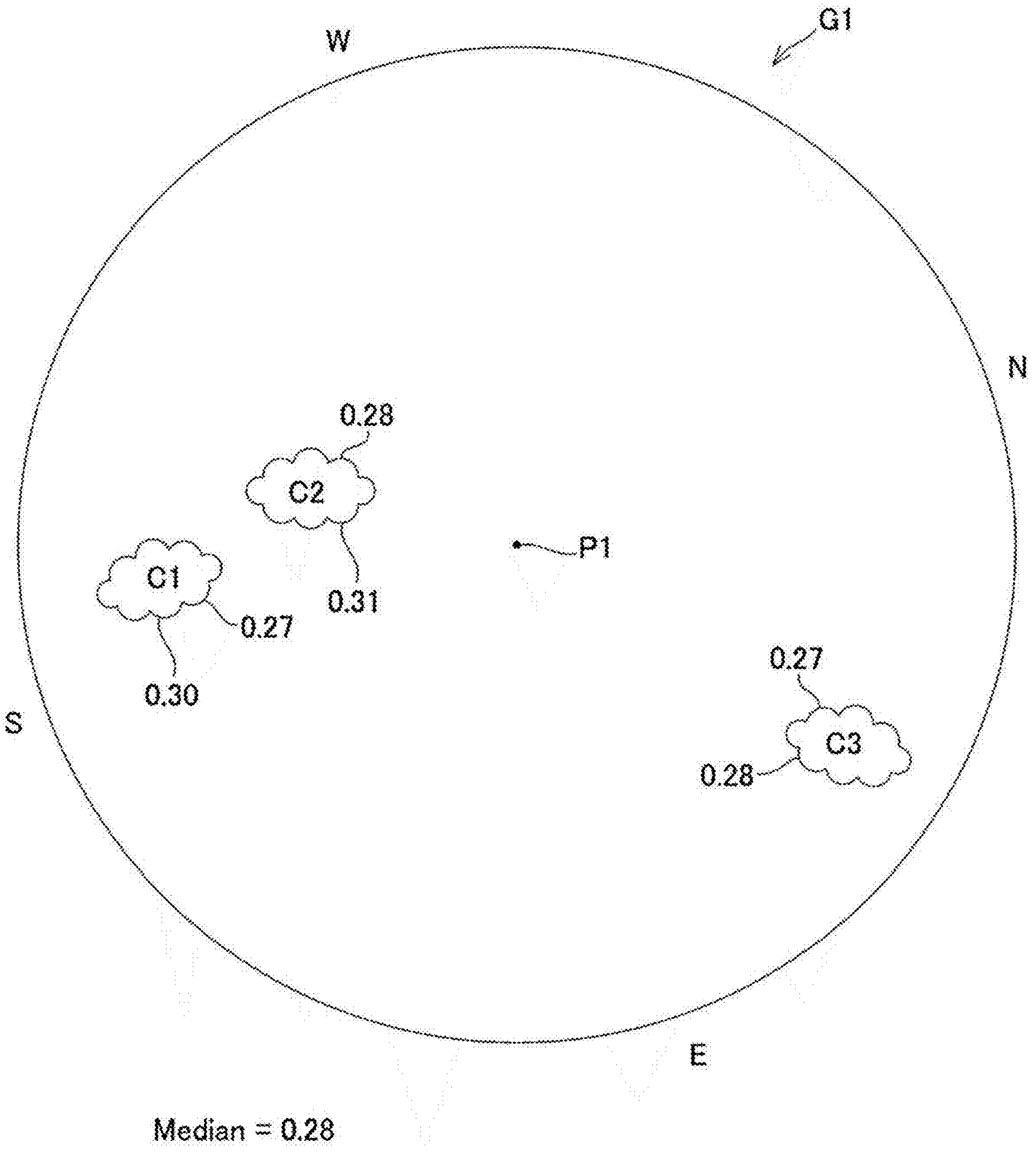
FIG. 2 is an explanatory diagram for a sky image taken by a camera.

The cloud observation system 1 of the first embodiment processes sky images G1, G2 taken by at least one camera 10. The sky image contains the sky. The camera 10 can be any camera as long as it can photograph the sky. In this embodiment, an all-sky camera using a fisheye lens is set upwards to capture a wide area of the sky with a single camera, but it is not limited to this. If the camera 10 is placed vertically upward and horizontally, as shown in FIG. 2, a center P1 of the sky image G1 obtained from the camera 10 is directly above (elevation angle 90 degrees), and the elevation angle decreases as the center P1 moves toward an edge of the image. If the orientation of the camera 10 is known, the orientation in the image is also known. That is, each pixel at an arbitrary position in the sky image has a known elevation angle and a known orientation. In the figure, the directions are shown as North (N), South (S), West (W) and East (E).

As shown in FIG. 1, the cloud observation system 1 has an acquisition unit 11, a threshold determination unit 12, and a cloud determination unit 13. The cloud observation system 1 may have a moon detection unit 14 and a sky area setting unit 15. These units 11~15 are realized in cooperation of software and hardware in a computer equipped with a processor (processing circuitry) 1*b* such as a CPU, storage 1*a* such as a memory, various interfaces, etc., by the processor 1*b* executing a program stored in the memory 1*a* beforehand.

The acquisition unit 11 shown in FIG. 1 acquires at least one sky image. For cloud observation, the camera 10 is preferably taken periodically to obtain sky images G1, G2. A period of photographing by the camera 10 can be set arbitrarily, for example, every minute, every 5 minutes, every hour, etc. When shooting at night, the camera 10 needs to have a longer shutter speed compared to daytime. The shutter speed also affects the camera equipment, aperture, and other shooting conditions, such as 2.5 to 5 seconds. Since the way the sky image is captured also changes according to the shutter speed, it is preferable to take a plurality of pictures with the camera 10 at different shutter speeds to obtain a plurality of sky images each time the prescribed shooting timing comes. This is because a sky image with an appropriate shutter speed can be selected from the plurality of sky images.

Figure 6:
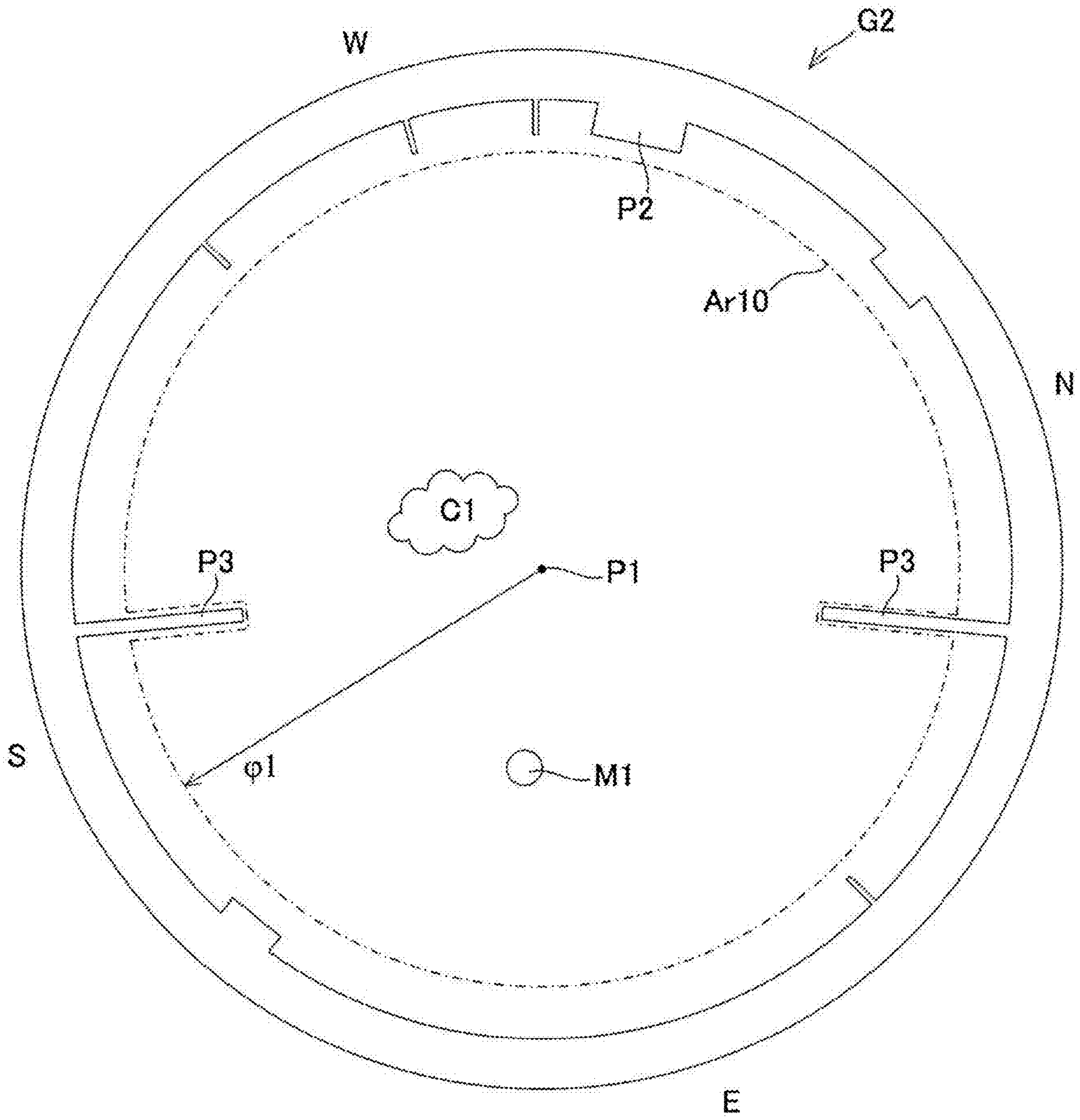
FIG. 6 illustrates an example of a sky image obtained from an all-sky camera.

The sky area setting unit 15 shown in FIG. 1 sets a sky area Ar10 in the sky image as shown in FIG. 6. FIG. 6 illustrates the sky image G2 obtained from the all-sky camera 10. As shown in FIG. 6, in the periphery of the sky image G2 obtained from the all-sky camera 10, there are cases where city buildings surrounding the all-sky camera 10, city lights, obstacles, and other non-sky objects P2 appear. Therefore, the sky area setting unit 15 removes a fringe part of the sky image G1 from the sky area Ar10 where the sky is visible. The fringe part means the area that lies outside the circle with a prescribed radius of φ1 from the directly above P1 of the sky image. In addition, when an obstacle P3 is not in the periphery but is reflected, the obstacle P3 is also removed from the sky area Ar10. In FIG. 6, the sky area Ar10 is indicated by a dashed line. As the method by which the sky area setting unit 15 sets the sky area Ar10, it may be specified based on the coordinates individually specified by the user in advance, or it may be automatically recognized. An example of an automatic method of recognition is taking the plurality of sky images in succession during the day and using the change in pixel values in the area where clouds flow. Specifically, an area inside a circle of a prescribed radius, φ1, in the sky image G2, in which the change in pixel values is relatively large among the plurality of sky images is recognized as a sky area, Ar10. Conversely, a method for recognizing an area with relatively little change in pixel values as a non-sky area can be mentioned. The prescribed radius, φ1, can be changed appropriately depending on the performance of the camera. In the case of a fisheye lens, the larger the prescribed radius, φ1, the greater the distortion of the image, so that it can be changed appropriately according to the performance of the camera.

The threshold determination unit 12 shown in FIG. 1 determines the threshold value based on the pixel values of the plurality of edges in the sky image. The threshold value is used in the cloud determination unit 13 for cloud determination. As shown in FIG. 2, when sky image G1 shows clouds (C1, C2, C3), the boundary between the sky and clouds can be detected as an edge. An edge is a pixel whose pixel value changes rapidly compared to surrounding pixels in a sky image. The edge detection method can utilize various known algorithms. For example, the differential value of the pixel value is used.

During the day, clouds are white and the sky is blue due to sunlight refraction, so it is possible to determine clouds by comparing their blueness. But at night, in the absence of sunlight, blue comparisons can't detect clouds. At night, the clouds are brighter than the sky because the moonlight and city lights are reflected back by the clouds and reach the camera 10. Therefore, in this embodiment, the lightness difference based on the pixel value is used to determine whether or not the pixel is a cloud. The lightness (L) used in this embodiment is calculated by (the red value (R) of the pixel+the green value (G) of the pixel+the blue value (B) of the pixel)/3, but the formula for calculating the lightness can be changed variably.

Since there is a high possibility that the threshold value of the pixel value (lightness) for distinguishing the cloud from the sky is different for each sky image, the threshold determination unit 12 determines a threshold value for each sky image. The threshold determination unit 12 determines the threshold value based on the pixel values (lightness) of the plurality of edges in the sky image. Specifically, as shown in FIG. 2, the pixel values (lightness) of the plurality of edges, which are often the boundaries between clouds and sky, are calculated respectively, and statistical processing is performed on the plurality of pixel values (lightness) to determine the threshold value. In this embodiment, a median of the plurality of pixel values (lightness) is used as the threshold value, but it is not limited to the median as statistical processing. For example, it may be mean or frequency. The median can be used to determine an appropriate threshold value without noise, such as a jump. In the example shown in FIG. 2, an edge of cloud C1 has a portion with luminosity=0.27 and another portion with luminosity=0.30. An edge of cloud C2 has a portion with luminosity=0.28 and another portion with luminosity=0.31. An edge of cloud C3 has a portion with luminosity=0.27 and another portion with luminosity=0.28. In this case, the median value of each luminosity is 0.28 and the threshold value is determined to be 0.28. Since the figures do not illustrate the lightness of all edge pixels, some lightness values are illustrated for ease of understanding.

Figure 3:
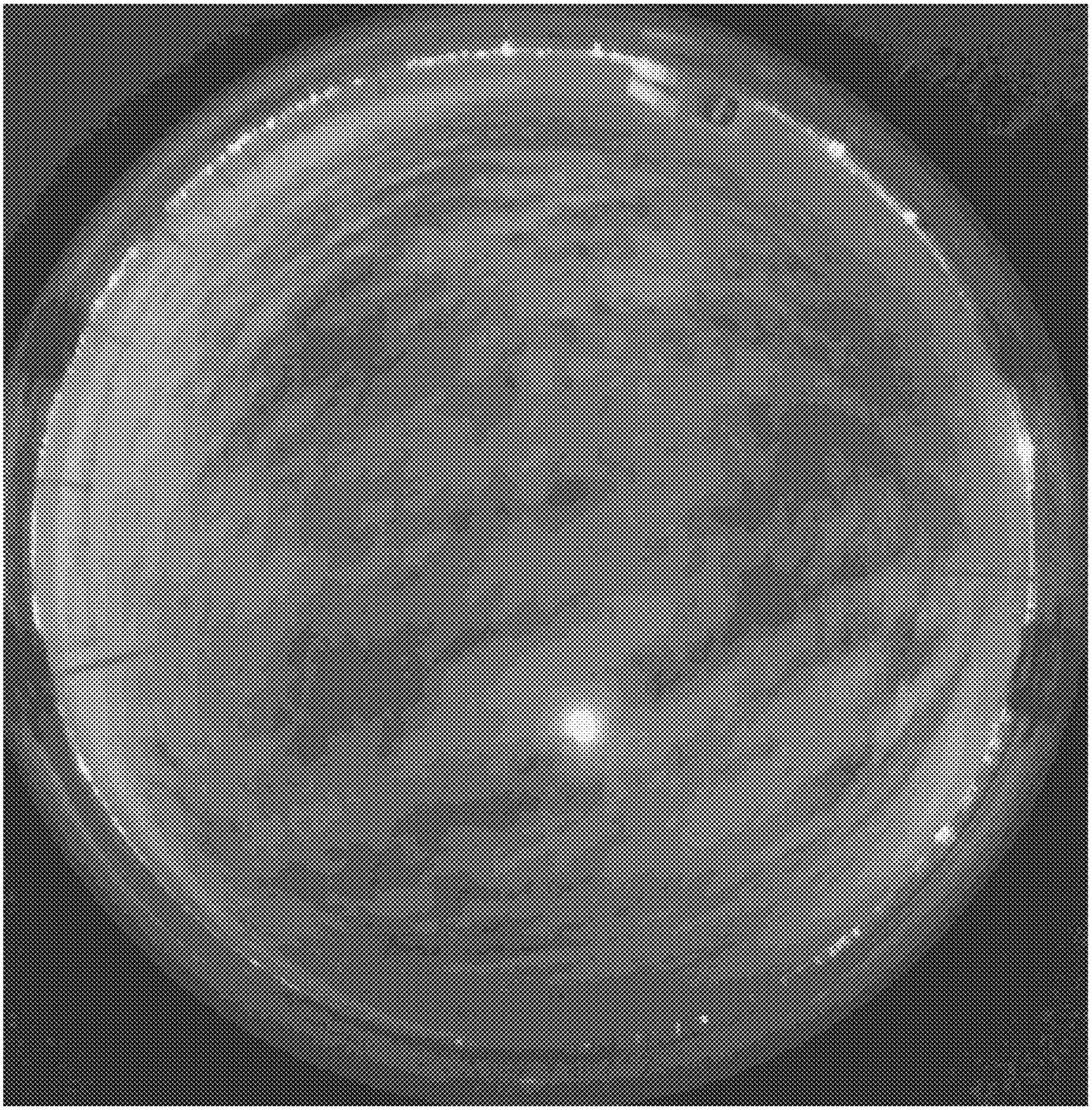
FIG. 3 illustrates an actual sky image in grayscale.
Figure 4:
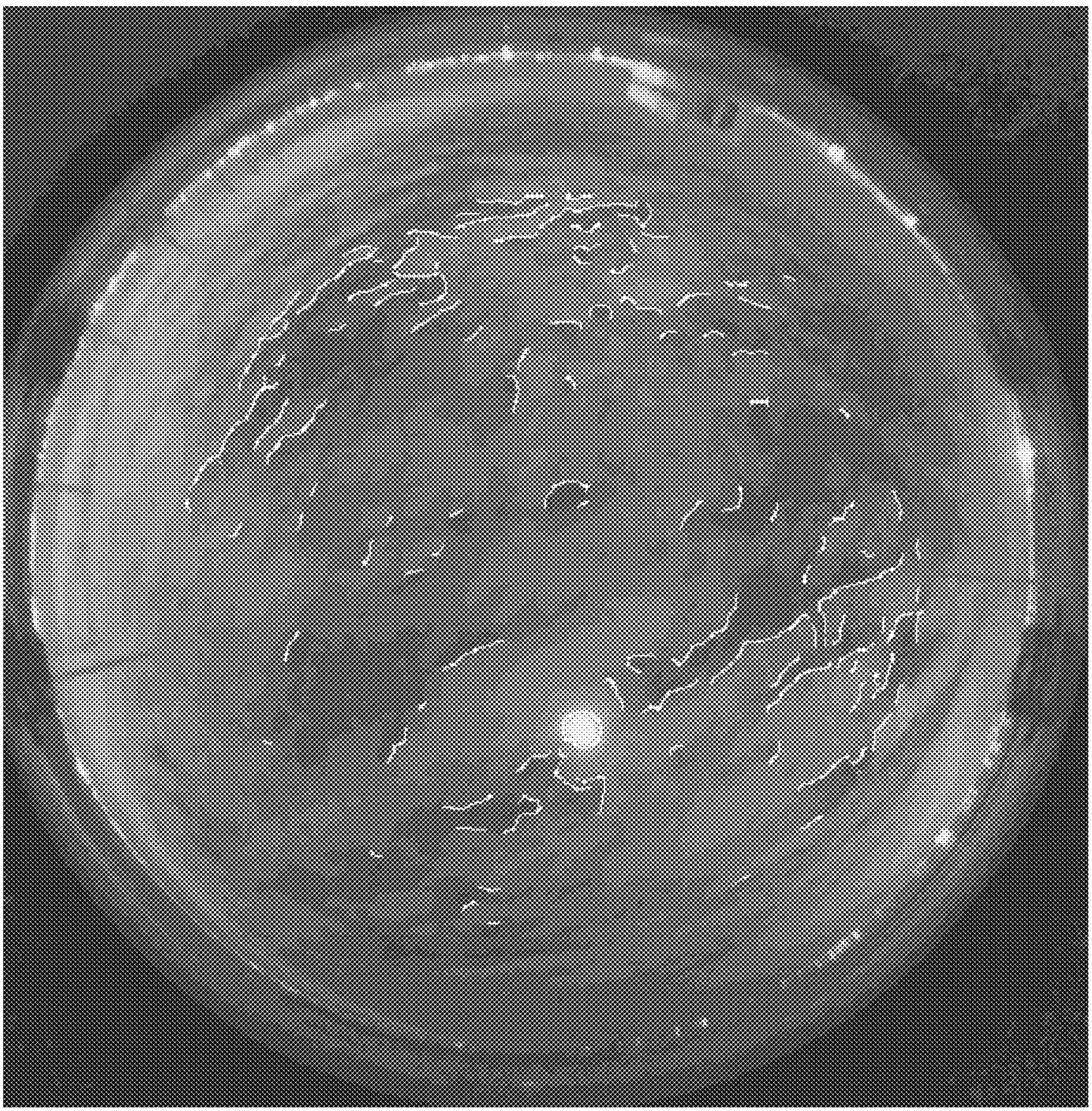
FIG. 4 illustrates edges extracted from the sky image shown in FIG. 3 in white.
Figure 5:
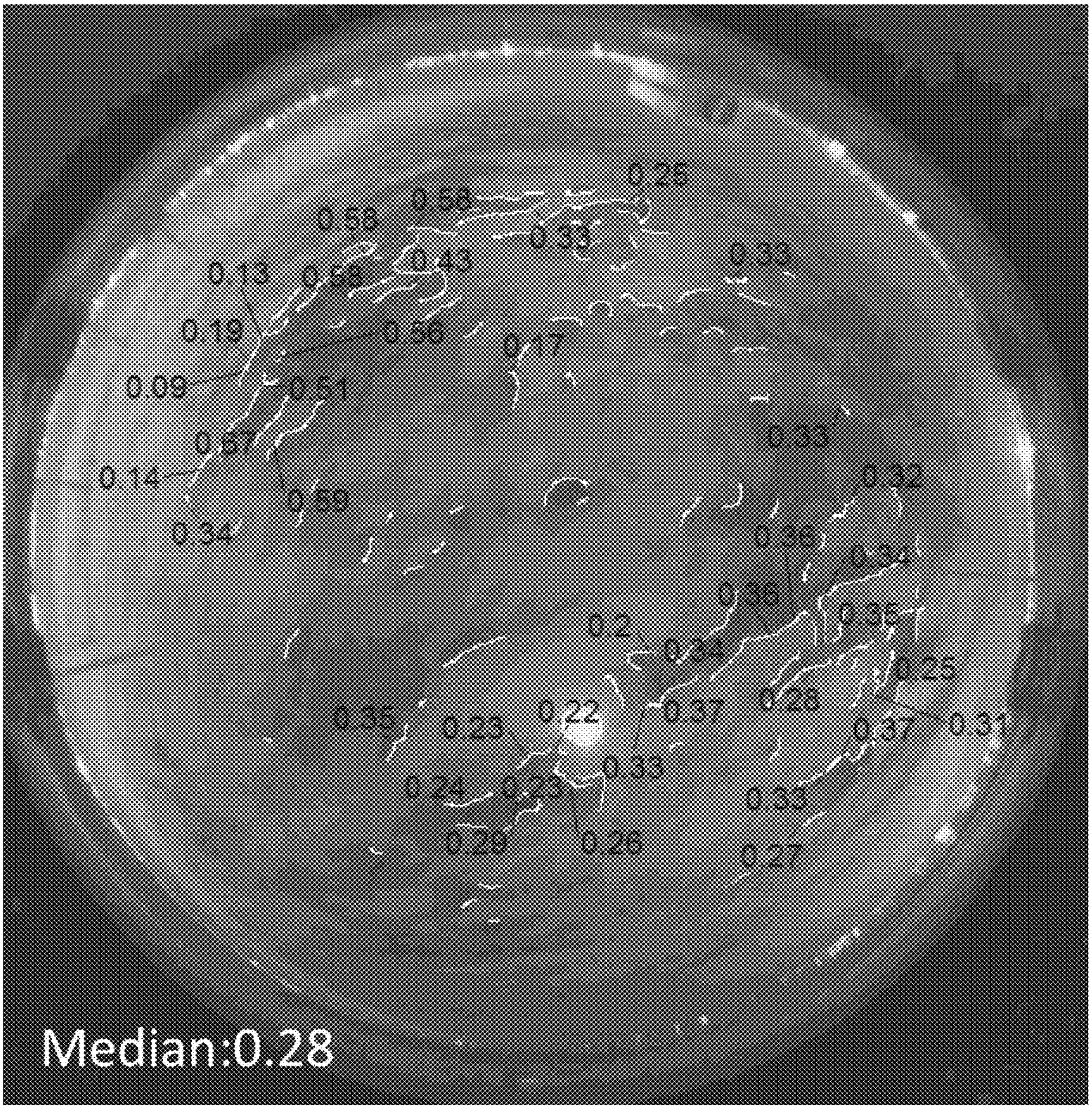
FIG. 5 illustrates the lightness of the extracted edge with a number in the figure and showing the median value of the lightness.

FIGS. 3~5 illustrate diagrams illustrating how the threshold value is determined based on an actual sky image. FIG. 3 illustrates the sky image acquired by the acquisition unit 11 in gray scale. FIG. 4 illustrates the edges extracted from the sky image shown in FIG. 3 in white. FIG. 5 illustrates the lightness of the extracted edge as a number in the figure and shows that the median value of the lightness is 0.28. As shown in FIG. 5, it can be seen that the threshold value pixel value (lightness) varies depending on the location in the sky image.

If the sky area Ar10 in the sky image contains almost all clouds or almost all clear sky, no edges are detected or fewer edges are detected. In this case, the threshold value cannot be determined based on the pixel values of the plurality of edges. Therefore, in the first embodiment, the threshold determination unit 12 is configured as follows.

That is, the threshold determination unit 12 extracts edges in the first sky image G1 taken at the first time point. If the number of extracted edges is less than a predetermined value, the threshold value determined based on the second sky image G2 taken at the second time point is adopted as the threshold value for the first sky image G1. The second sky image G2 is an image taken at the same time on a different day from the shooting date of the first sky image G1. This is because, on other days, it may be possible to detect edges exceeding a given value due to a mixture of clouds and sky, and at the same time, the threshold value conditions are considered to be the same or nearly the same. Here, for the same time zone, for example, the same time in the same camera is preferable, but there may be a time difference. The time difference between the first time point and the second time point is preferably zero or smaller. However, it is possible to produce an effect even if there is a time lag of, say, 10 minutes. More preferably, within 2 minutes, preferably within 1 minute, more preferably within 10 seconds. The difference in days between the first sky image G1 and the second sky image G2 is preferably within seven days, more preferably within three days, and even more preferably within one day. This is because if the difference is one day, it is considered that there is little difference in the threshold value.

When a plurality of second sky images exist, it is preferable to select a second sky image having the same moon age as the first sky image or the closest moon age from the plurality of second sky images. This is because the phases of the moon will be the same or similar, and the lightness of the clouds by the moon will be the same or similar.

Based on the pixel values and threshold values in the sky image, the cloud determination unit 13 shown in FIG. 1 determines a pixel (hereinafter also referred to as cloud pixels) in which a cloud appears from a plurality of pixels (hereinafter also referred to as sky pixels) constituting the sky image. In this embodiment, the threshold determination unit 12 determines a threshold value based on the lightness of the pixel, and the cloud determination unit 13 determines a cloud pixel based on the lightness and threshold value of the pixel in the sky image. In the examples of FIG. 2 and FIG. 5, since the threshold value is 0.28, the cloud determination unit 13 determines that a pixel with a lightness of 0.28 or higher or a pixel with a lightness greater than 0.28 is a cloud pixel. In this embodiment, one threshold value is used for the target range of the sky area Ar10 in the sky image.

The moon detection unit 14 shown in FIG. 1 detects pixels indicating the moon M1 in the sky image. The pixels indicating the moon M1 are relatively the brightest compared to other pixels in the sky area. In the example of FIG. 6, the lightness of the pixels in the area where the moon M1 is located becomes higher. The moon detection unit 14 calculates the lightness of all pixels in the sky area Ar10 and determines the highest pixel to be the one indicating the moon M1. When the moon detection unit 14 is implemented, the target range from which the threshold determination unit 12 extracts edges and the target range from which the cloud determination unit 13 determines clouds are preferably the ranges from which the range of the moon is removed from the sky area Ar10. This is to avoid the influence of moon pixels on the threshold value.

Figure 7:
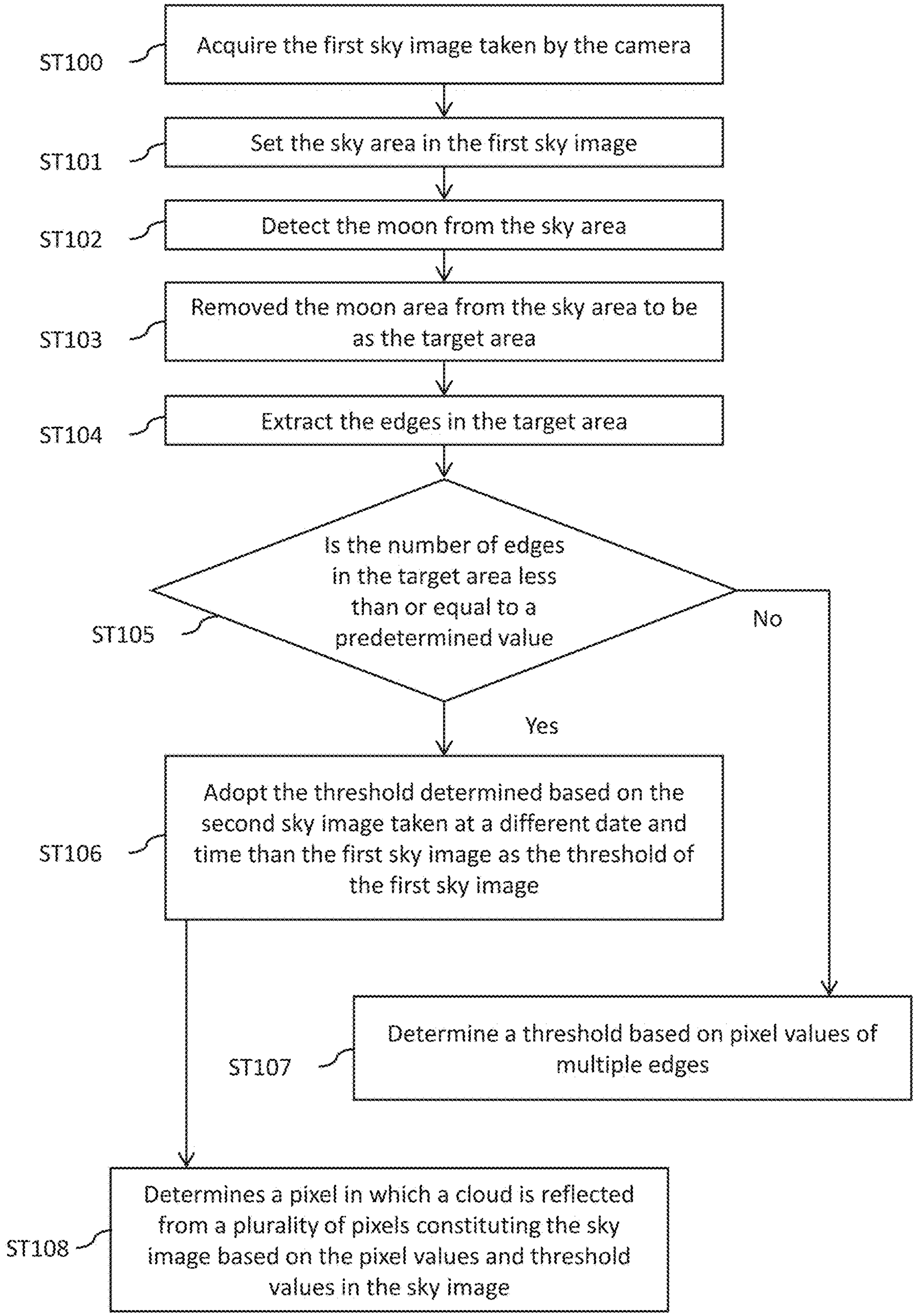
FIG. 7 is a flow chart illustrating the processing performed by the cloud observation system of the first embodiment.

Cloud observation method of the first embodiment. The cloud observation method executed by the cloud observation system 1 is described with reference to FIG. 7.

First, in step ST100, the acquisition unit 11 acquires the first sky image taken by the camera 10. In the next step ST101, the sky area setting unit 15 sets the sky area Ar10 in the first sky image. In the next step ST102, the moon detection unit 14 detects the moon in the sky area Ar10 of the sky image. In the next step ST103, the moon area is removed from the sky area Ar10 to be the target area for threshold value determination and cloud determination. Then, in step ST104, the threshold determination unit 12 extracts the edge of the target area. If the number of edges of the target area is equal to or less than a predetermined value (ST105: YES), the threshold determination unit 12 adopts the threshold value determined based on the second sky image taken at the same time zone on a different day from the shooting date of the first sky image as the threshold value of the first sky image in step ST106, and moves to the next step ST108. On the other hand, when the number of edges of the target area is not less than a predetermined value (ST105: NO), in step ST107, the threshold determination unit 12 determines a threshold value based on the pixel values of the plurality of edges, and the process moves to the next step ST108. In step ST108, the cloud determination unit 13 determines a pixel in which a cloud is reflected from a plurality of pixels constituting the sky image based on the pixel values and threshold values in the sky image.

Figure 8:
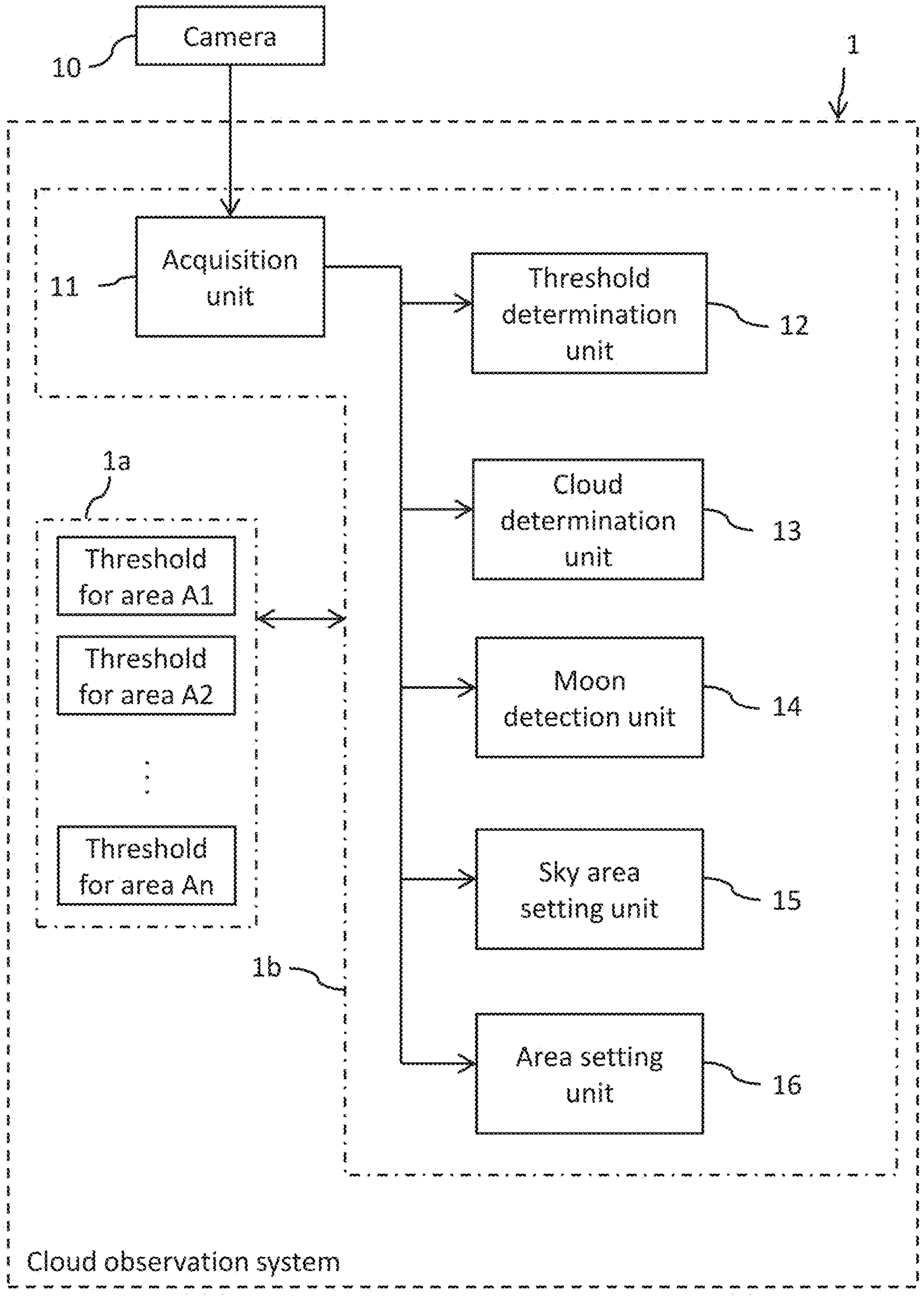
FIG. 8 is a block diagram illustrating the configuration of a cloud observation system of a second embodiment.
Figure 9:
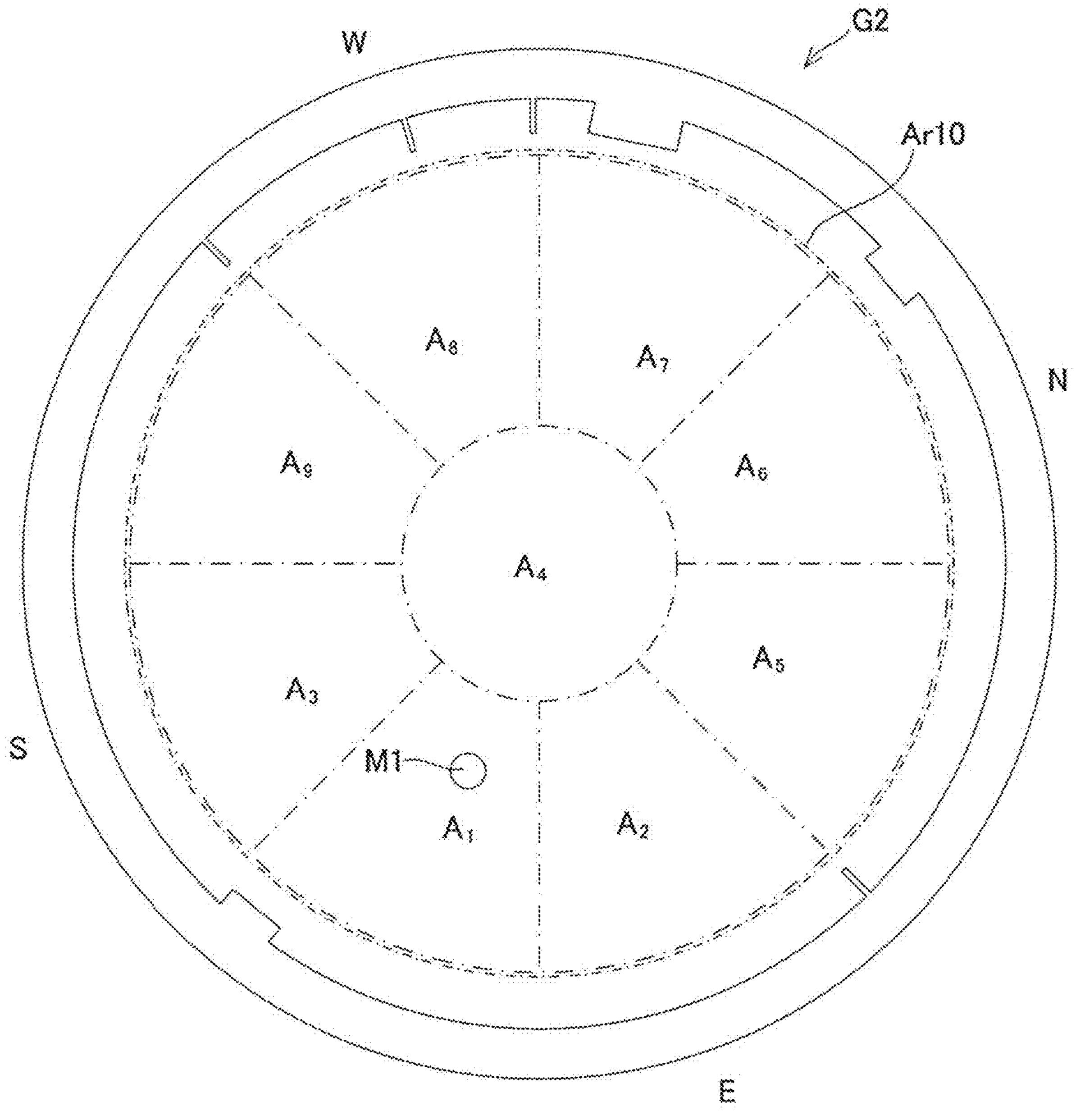
FIG. 9 illustrates a plurality of areas set in a sky image.

The cloud observation system 1 and method of the second embodiment are described. The same units as in the first embodiment are denoted by the same symbols, and the explanation is omitted. As shown in FIG. 8, the cloud observation system 1 of the second embodiment further has an area setting unit 16. The area setting unit 16 sets a plurality of areas (A1, A2 . . . An) for the sky image G2 (preferably the sky area Ar10 of the sky image G2) as shown in FIG. 9. n is a natural number greater than or equal to 2. In the example of FIG. 9, n=9, but the number of areas can be changed accordingly. The shape by which the sky area Ar10 is divided into plurality of areas can also be changed arbitrarily. The threshold determination unit 12 determines threshold values for each of the plurality of areas A1 to A9. The cloud determination unit 13 determines the pixels in which clouds in the area appear, using the threshold values of the areas A1 to A9, respectively.

That is, in the first embodiment, only one threshold value is determined for the sky image, and clouds are determined by one threshold value. In contrast, in the second embodiment, the sky image is divided into plurality of areas A1 to A9, a threshold value is determined for each area, and cloud pixels are determined for each area.

For example, as shown in FIG. 9, the area A1 close to the moon (M1) in the sky image G2 is easily brightened by the influence of the moon. Conversely, the portion of sky image G2 that is far from the moon (M1) (For example, area A7, etc.) is unaffected by the moon and becomes relatively dark. In addition, the sky image G2 includes directions close to city lights (For example, N, W, S) and directions without city lights such as the sea (E). Directions without city lights, such as the sea, are relatively dark compared to directions close to city lights. Therefore, in the sky image G2, the lightness of clouds varies from place to place. Therefore, since the sky image G2 is divided into plurality of areas A1 to A9, and the threshold value for each area is determined to determine the clouds for each area, the accuracy of cloud determination can be improved compared with the case where one threshold value is used for the whole sky image.

Specific methods for determining the threshold value are as follows:

(1) For each area A1 to A9, the threshold value may be determined based on the pixel value (lightness) of the edge within the area, (2) The first threshold value may be determined based on the pixel values (lightness) of all edges within the target range of the sky area Ar10 (within plurality of areas A1 to A9), and the threshold value of each area A1 to A9 may be determined by correcting the first threshold value according to the orientation corresponding to the area. For example, if east (E) is dark and northwest (N, W) is light, the value obtained by subtracting the value corresponding to east (E) from the first threshold value may be used as the threshold value for area A2, and the value obtained by adding the value corresponding to northwest (N, W) from the first threshold value may be used as the threshold value for areas A6 to A9. In this case, the correction value corresponding to the bearing is preset, and (3) The first threshold value may be determined based on the pixel values (lightness) of all edges within the target range of the sky area Ar10, and the threshold values of each area A1 to A9 may be determined by correcting the first threshold value with a correction value corresponding to the pixel values (lightness) of the peripheral area corresponding to the area. For example, the threshold value of area A7 is determined by correcting the first threshold value with a correction value corresponding to the pixel value of the outer periphery of area A6 (the pixel value of the northern periphery).

That is, when the above (2) and (3) are put together, the threshold values for each area are determined based on the pixel values of the edges in the plurality of areas A1 to A9 and the pixel values of the fringe part of the sky image G2.

Figure 10:
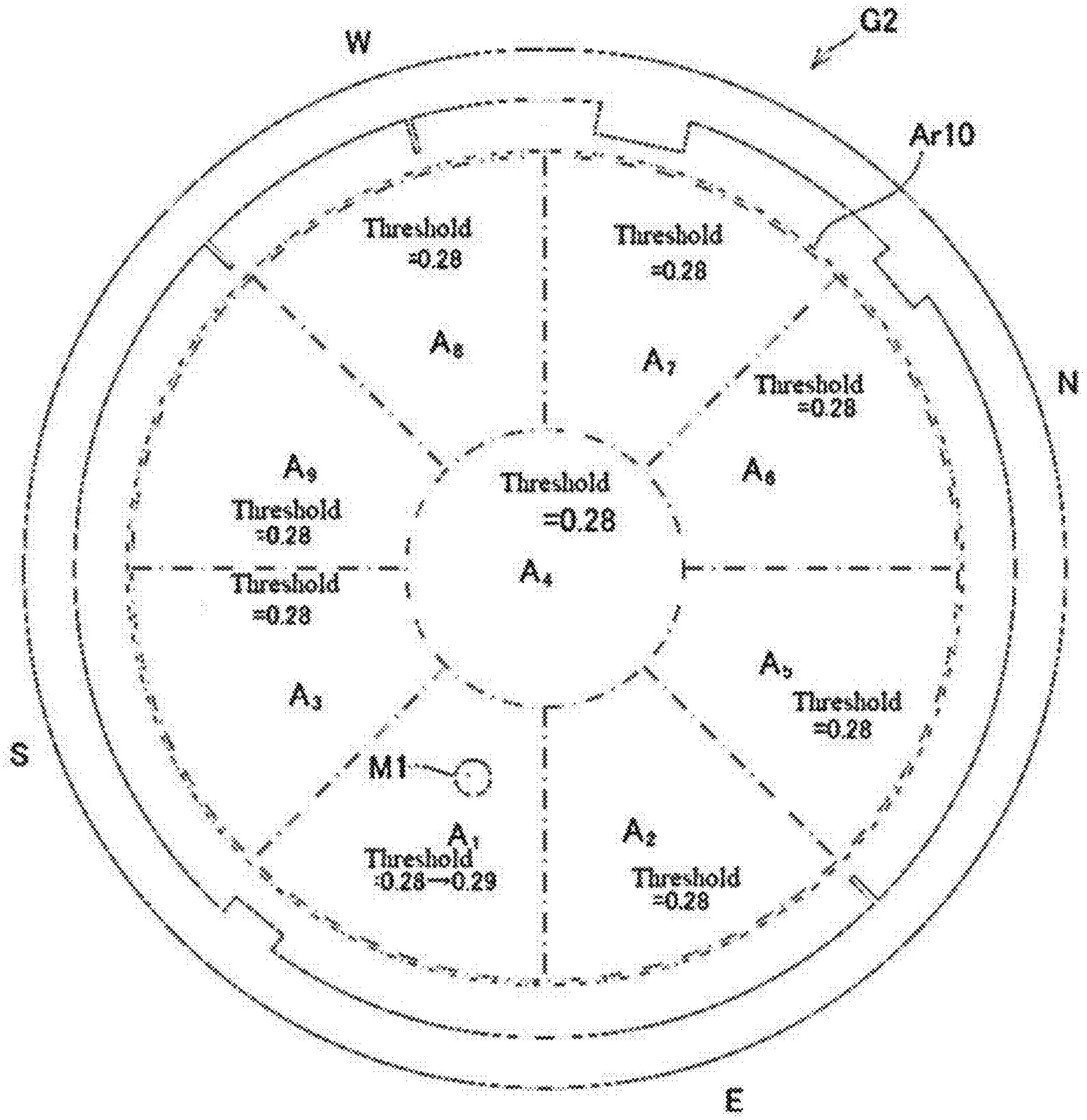
FIG. 10 is an explanatory diagram of the method of determining the threshold values for each of the plurality of areas.
Figure 11:
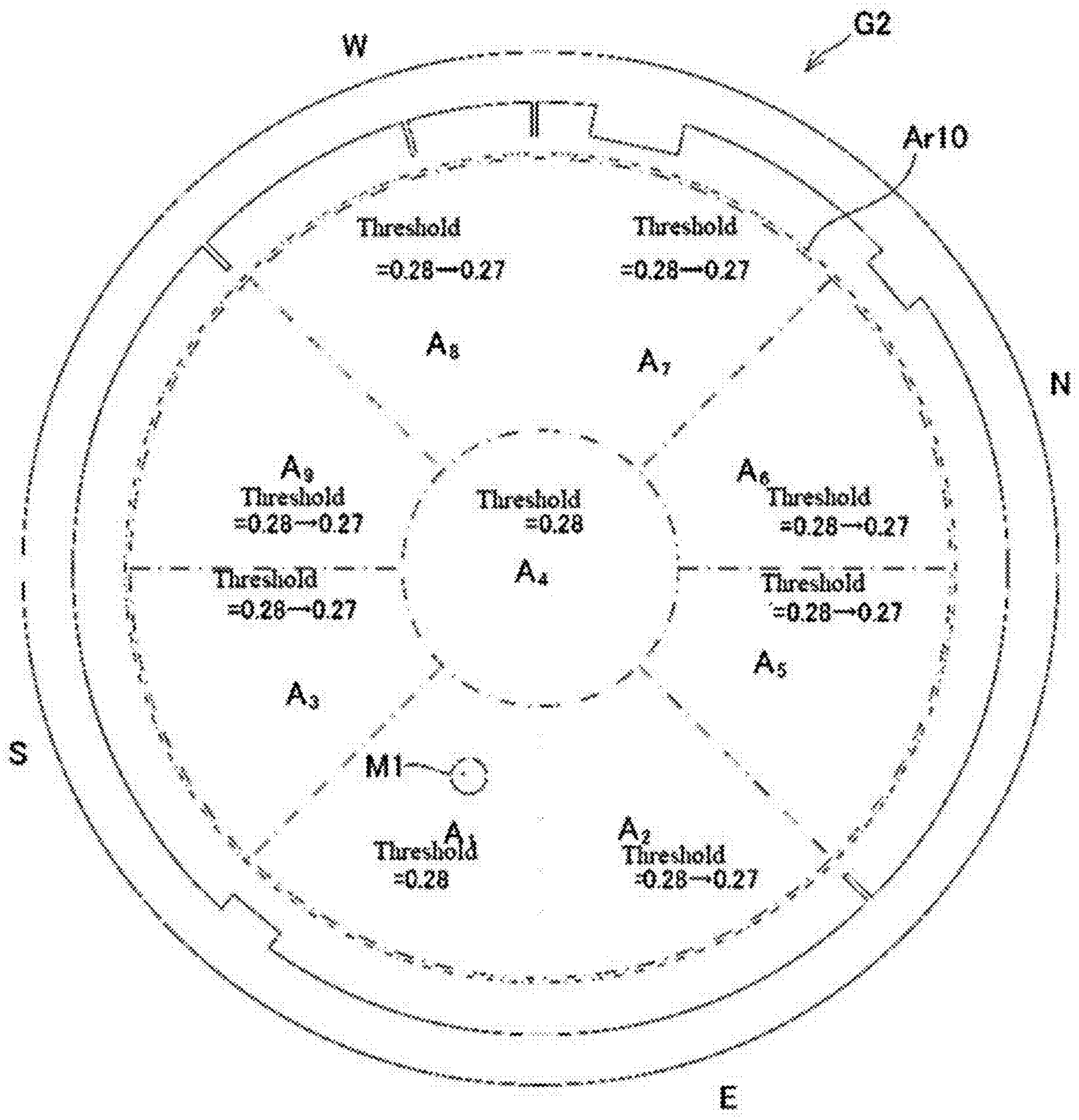
FIG. 11 is an explanatory diagram of the method of determining the threshold values for each of the plurality of areas.

(4) As shown in FIG. 10, the plurality of areas have area A1 (first area) containing the moon (M1) and areas A2-A9 (second area) further away from the moon (M1) than area A1 (first area). The threshold value 0.28 may be determined based on the pixel values of the edges in the plurality of areas (A1 to A9) including the first and second areas, and the threshold value of the first area (A1) and the threshold value of the second area (A2 to A9) may be different. As an example of a specific calculation method, a threshold value of 0.28 may be calculated from the pixel values of the edges of all areas, and the threshold value of the first area (A1) may be corrected in the bright direction to, for example, 0.29. As shown in FIG. 11, the threshold value 0.28 calculated based on the plurality of areas (A1 to A9) may be set as the threshold value of the first area (A1), and the threshold value of the second area (A2 to A9) may be corrected in the dark direction to, for example, 0.27.

Figure 12:
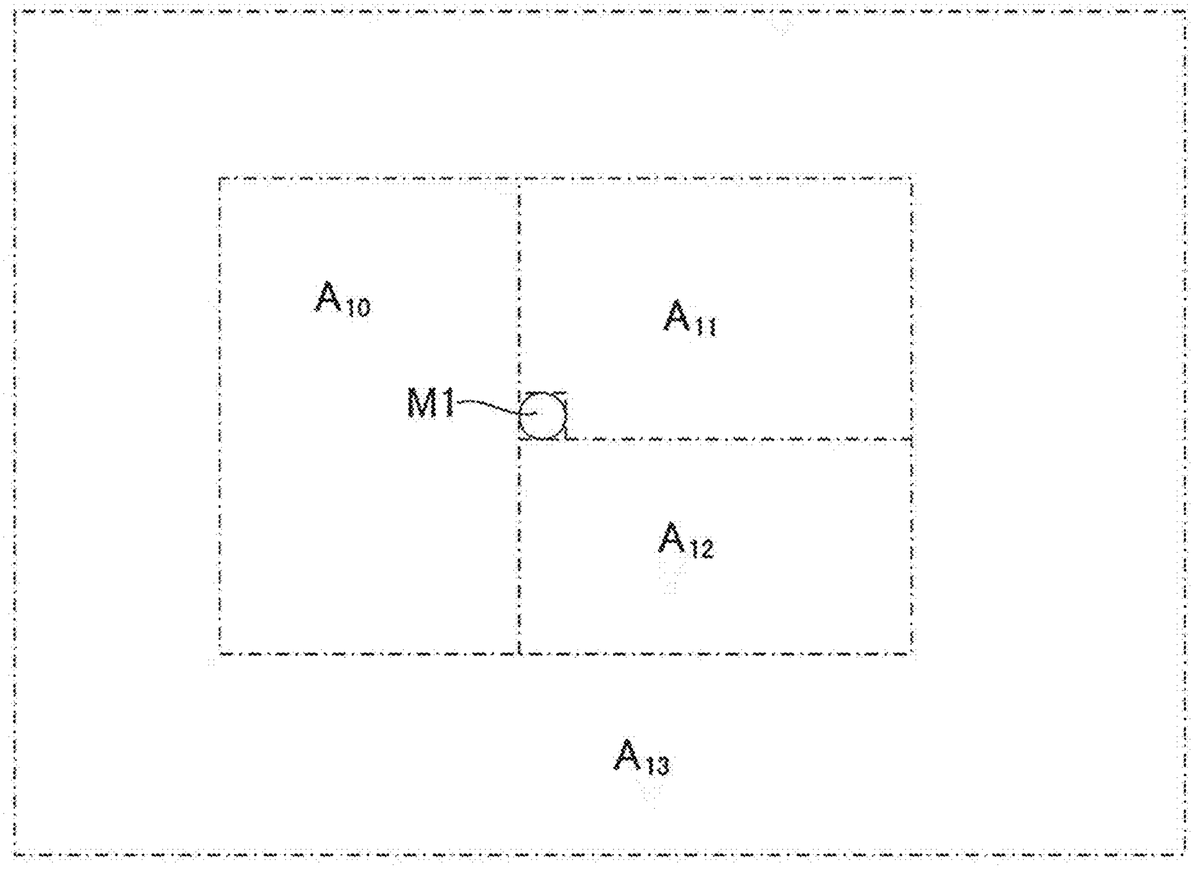
FIG. 12 is an explanatory diagram of the method of determining the threshold values for each of the plurality of areas.

(5) As shown in FIG. 12, when the plurality of areas (A10 to A13) are set except for the moon (M1), the area adjacent to the moon (A10, A11, A12) may be designated as the first area, and the area further away from the moon (M1) than the first area (A10, A11, A12) (A13) may be designated as the second area.

Figure 13:
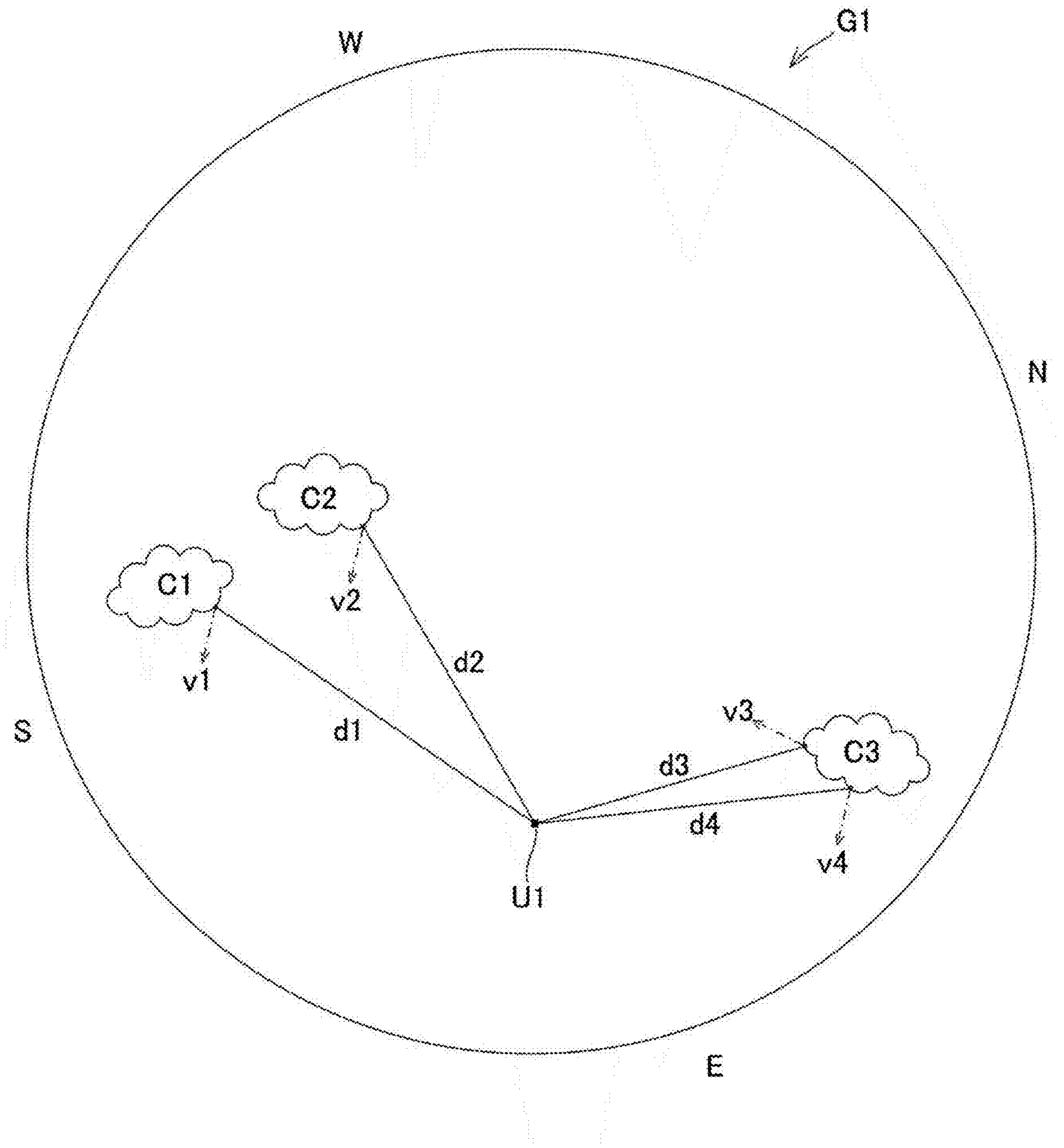
FIG. 13 is an explanatory diagram of the method for determining the threshold value of each pixel of the sky image in a third embodiment.

Like the first embodiment shown in FIG. 1, the third embodiment does not have the area setting unit 16 for setting the plurality of areas. As shown in FIG. 13, the threshold determination unit 12 determines the threshold value of each of the plural pixels constituting the sky image G1 based on the distance from the pixel to the edge and the pixel value of the edge. The cloud determination unit 13 determines using the threshold values of each pixel constituting the sky image. For example, as shown in FIG. 13, when the threshold value of a certain pixel (U1) is calculated, the threshold value is calculated based on the distance from the pixel (U1) to the edge (d1, d2, d3, d4) and the pixel value of the edge (v1, v2, v3, v4). The effect of edge pixel values (lightness) on a given pixel (U1) is greater at closer distances and less at farther distances. Therefore, when determining the threshold value of a certain pixel (U1), it is necessary to weight the pixel values of all edges by distance. This makes it possible to increase the influence of the pixel value of an edge with a short distance from a certain pixel (U1) and to reduce the influence of the pixel value of an edge with a long distance from a certain pixel (U1). With this method, the accuracy of the threshold value can be greatly improved, although the computational cost increases.

In the above embodiment, the threshold value used for cloud determination is lightness, but it is not limited to this. For example, a pixel value may be a monochromatic pixel value or a combination of pixel values as appropriate.

As described above, the cloud observation system 1 of the first, second, and third embodiment consists of a sky image taken by the camera 10 that contains the sky (G1; G2), the threshold determination unit 12 that determines a threshold value based on the pixel values of a plurality of edges in the sky image, and the cloud determination unit 13 that determines a pixel indicating a cloud from a plurality of pixels constituting the sky image based on the pixel values and threshold values in the sky image.

The cloud observation methods of the first, second and third embodiment are to acquire a sky image taken by the camera 10 that contains the sky (ST100) and to determine a threshold value based on the pixel values of the plurality of edges in the sky image (ST107; ST106) and determining the pixels with clouds from the plurality of pixels composing the sky image based on the pixel values and threshold values in the sky image (ST108).

In this way, the edge in the sky image is often the boundary between the cloud and the sky, and the threshold value is determined based on the pixel values of the plurality of edges in the sky image. Therefore, the clouds can be identified and observed even at night when the color of the sky is not reflected by sunlight during the day.

Although not particularly limited, as in the first, second and third embodiment, it is preferable that the threshold determination unit 12 determines the threshold value based on the lightness of the pixels of the plurality of edges, and the cloud determination unit 13 determines the pixel in which the cloud appears based on the lightness and threshold value of the pixels in the sky image.

With this configuration, it is possible to improve the accuracy of cloud determination compared to, for example, determining clouds based on single-color pixel values.

Although not particularly limited, as in the second embodiment, the area setting unit 16 for setting a plurality of areas (A1 to A9; A10 to A13) for the sky image) is provided, the threshold determination unit 12 determines threshold value for each of the plurality of areas (A1 to A9; A10 to A13), and it is preferable that the cloud determination unit 13 uses the threshold value of each area to determine the pixels in which clouds appear.

For example, areas of the sky image that are closer to the moon are more likely to brighten under the influence of the moon. Conversely, the portion of the sky image that is far from the moon is relatively dark without the influence of the moon. Sky images also include directions close to city lights and directions without city lights, such as the sea, which are relatively darker than directions close to city lights. Therefore, by setting the plurality of areas in the sky image and using a threshold value for each area, it is possible to improve the accuracy of determining clouds compared to using one threshold value for the entire sky image.

Although not particularly limited, as in the second embodiment shown in FIG. 9, the sky image G2 is an image taken by an all-sky camera, and it is preferable that the threshold determination unit 12 determines the threshold values of each of the areas (A1 to A9) based on the pixel values of the edges in the plurality of areas and the pixel values of the peripheral of the sky image G2.

In this way, not only the pixel values of the edges in the plurality of areas, but also the pixel values of the periphery of the sky image, where city lights and the like may be visible, are used to determine the threshold value for each area, so that the threshold value can be determined in consideration of city lights and cloud determination accuracy can be improved.

Although not particularly limited, as in the second embodiment shown in FIG. 10~12, it is equipped with the moon detection unit 14 that detects pixels indicating the moon in the sky image G2, and has the plurality of areas (A1 to A9; A10 to A13) including the first area (A1; A10 to A12) containing or adjacent to the moon (M1), and the second area (A2 to A9; A13), which is farther from the moon than the first area, and the threshold determination unit 12 determines the threshold value of each area based on the pixel values of the edges in the plurality of areas including the first and second areas, and sets the threshold value of the first area and the threshold value of the second area to different values.

The edge of the first area containing or adjacent to the moon is susceptible to moonlight and is likely to be bright. Therefore, while determining the threshold value based on the pixel values of the edges in the plurality of areas, the threshold values of the first and second areas are made different. As a result, the threshold value of the first area, which is susceptible to moonlight, and the threshold value of the second area, which is not susceptible to moonlight, can be set appropriately, and the cloud determination accuracy can be improved.

Although not particularly limited, as in the third embodiment, it is preferable that the threshold determination unit 12 extracts a plurality of edges in the sky image G1 and determines the threshold values of each of the plurality of pixels constituting the sky image G1 based on the distance from the pixel to the edge (d1, d2, d3, d4) and the pixel value of the edge (v1, v2, v3, v4), and that the cloud determination unit 13 uses the threshold values of each of the pixels constituting the sky image G1.

Edges closer to a pixel have a greater impact on cloud judgment than edges farther from a pixel. Therefore, since the threshold value is determined based on the distance from the pixel to the edge and the pixel value of the edge, it becomes possible to improve the cloud determination accuracy compared with the case where the threshold value is determined uniformly.

Although not particularly limited, as in the first, second and third embodiment, it is preferable that the moon detection unit 14 is provided to detect pixels indicating the moon in the sky image, and the threshold determination unit 12 extracts the edge by removing the range of the moon from the target range from which the edge is extracted.

With this configuration, the range of the moon that affects the determination of the threshold value is removed, and edges are extracted, which makes it possible to improve the accuracy of cloud determination.

Although not particularly limited, as in the first, second and third embodiment, the acquisition unit 11 acquires the first sky image. When the number of edges extracted based on the acquired first sky image is equal to or less than a predetermined value, a threshold value determined based on the second sky image photographed at the same time zone on a different day from the date and time of the first sky image is adopted as the threshold value of the first sky image.

If the number of edges is less than the prescribed value, the sky area in the first sky image is either all cloudy or all clear, and the threshold value cannot be determined. Therefore, since the threshold value of the second sky image in the same time zone of another day is used, which is considered to have almost the same threshold value condition, the clouds in the first sky image can be judged appropriately.

Although not particularly limited, it is preferable that the sky image is an image taken by an all-sky camera as in the first, second and third embodiment, and the threshold determination unit 12 extracts the edge by removing the fringe part of the sky image from the target area from which the edge is extracted.

With this configuration, the edge of the sky image obtained from an all-sky camera using a fisheye lens, which is likely to show city lights themselves, is removed from the target range of edge extraction, so that an appropriate threshold value can be determined, and cloud determination accuracy can be improved.

The program according to this embodiment is a program that causes a computer (one or more processors) to execute the above method. In addition, a temporary recording medium readable by a computer according to this embodiment stores the above program.

As described above, the embodiment of the present disclosure has been described based on the drawings, but the specific configuration should not be considered to be limited to these embodiments. The scope of this disclosure is indicated by the claims as well as by the description of the above embodiment, and further includes all modifications within the meaning and scope of the claims.

For example, the execution order of each process, such as operations, procedures, steps, and steps in the devices, systems, programs, and methods presented in the claims, description, and drawings, can be realized in any order unless the output of the previous process is used in the later process. The use of "first," "second," etc., for convenience in describing the flow in the claims, the description, and the drawings does not mean that it is mandatory to carry out the procedures in this order.

Each unit 11~15 shown in FIG. 1 is realized by executing a predetermined program by the cloud observation system 1 or a processor, but each unit may be configured by a dedicated memory or a dedicated circuit.

In the cloud observation system 1 of the above embodiment, the units 11~15 are implemented in the processor 1*b* of one computer, but the units 11~15 may be distributed and implemented in a plurality of computers or clouds. That is, the above method may be performed by one or more processors.

It is possible to adopt the structure adopted in each of the above embodiment to any other embodiment. In FIG. 1, each unit 11~15 is implemented for illustrative purposes, but these units can be omitted arbitrarily.

The specific configuration of each unit is not limited to the above described embodiments, and various variations are possible without departing from the purpose of this disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A cloud observation system, comprising:

processing circuitry configured to:

acquire a sky image taken by a camera, the sky image containing the sky;

extract, from a plurality of pixels constituting the sky image, a plurality of edge pixels based on lightness differences between adjacent pixels;

determine lightness values of the plurality of edge pixels;

determine, for each acquired sky image, a threshold value by performing statistical processing on the lightness values of the plurality of edge pixels;

determine, under a low-light condition, a cloud pixel having a lightness value greater than or equal to the threshold value, the cloud pixel indicating a cloud, and identify the cloud based on the cloud pixel.

2. The cloud observation system according to claim 1, wherein the processing circuitry is further configured to:

set a plurality of areas for the sky image, determine a plurality of threshold values of each of the plurality of areas, and determine the cloud pixel indicating the cloud using the plurality of the threshold values for each of the plurality of areas.

3. The cloud observation system according to claim 2, wherein the sky image is an image taken by an all-sky camera, and the processing circuitry is further configured to determine the plurality of the threshold values of each of the plurality of areas based on the lightness values of the plurality of edge pixels in the plurality of areas and pixel values of a fringe part of the sky image.

4. The cloud observation system according to claim 3, wherein the processing circuitry is further configured to detect moon pixels indicating a moon in the sky image, the plurality of areas includes a first area containing or adjacent to the moon and a second area further away from the moon than the first area, and the processing circuitry is further configured to determine the threshold values of each of the areas based on the lightness values of the plurality of edge pixels in a plurality of areas including the first area and the second area, and set the threshold values of the first area and the second area to different values.

5. The cloud observation system according to claim 1, wherein the processing circuitry is further configured to:

extract a plurality of edges in the sky image, determine the threshold values for each of a plurality of sky pixels constituting the sky image based on a distance from the pixel to the edge and the pixel value of the edge, and determine the cloud pixel indicating the cloud using the threshold values of each sky pixel of the plurality of sky pixels constituting the sky image.

6. The cloud observation system according to claim 4, wherein the processing circuitry is further configured to:

detect moon pixels indicating the moon in the sky image, and extract the edge by removing a range of the moon from a target range for extracting edges.

7. The cloud observation system according to claim 6, wherein the sky image is a first sky image, and the processing circuitry is further configured to:

acquire a second sky image, the second sky image being taken in the same time zone on a different day from the date and time of the first sky image; and adopt the threshold value determined based on the second sky image as the threshold value of the first sky image when the number of edges extracted based on the first sky image is equal to or less than a predetermined value.

8. The cloud observation system according to claim 7, wherein the sky image is an image taken by an all-sky camera, and the processing circuitry is further configured to extract the edge by removing the fringe part of the sky image from a target range for extracting edges.

9. The cloud observation system according to claim 1, wherein the sky image is a first sky image, and the processing circuitry is further configured to:

acquire a second sky image, the second sky image being taken in the same time zone on a different day from the date and time of the first sky image; and adopt the threshold value determined based on the second sky image as the threshold value of the first sky image when the number of edges extracted based on the first sky image is equal to or less than a predetermined value.

10. The cloud observation system according to claim 1, wherein the sky image is an image taken by an all-sky camera, and the processing circuitry is further configured to extract the edge by removing a fringe part of the sky image from a target range for extracting edges.

11. The cloud observation system according to claim 5, wherein the processing circuitry is further configured to:

detect moon pixels indicating the moon in the sky image, and extract the edge by removing a range of the moon from a target range for extracting edges.

12. The cloud observation system according to claim 1, wherein the threshold value is determined as a median of the lightness values of the plurality of edge pixels.

13. A cloud observation method, comprising:

acquiring a sky image taken by a camera, the sky image containing the sky;

extracting, from a plurality of pixels constituting the sky image, a plurality of edge pixels based on lightness differences between adjacent pixels;

determining lightness values of the plurality of edge pixels;

determining, for each acquired sky image, a threshold value by performing statistical processing on the lightness values of the plurality of edge pixels;

determining, under a low-light condition, a cloud pixel having a lightness value greater than or equal to the threshold value, the cloud pixel indicating a cloud, and identifying the cloud based on the cloud pixel.

14. A non-transitory computer-readable medium having stored thereon computer-executable instructions which, when executed by a computer, cause the computer to execute the cloud observation method according to claim 13.

15. The cloud observation method according to claim 13, wherein the threshold value is determined as a median of the lightness values of the plurality of edge pixels.

* * * * *